(12) United States Patent
Madson

(10) Patent No.: US 9,522,382 B2
(45) Date of Patent: Dec. 20, 2016

(54) AFFINITY/LECTIN CHROMATOGRAPHY METHODS

(75) Inventor: Michael Madson, Garner, IA (US)

(73) Assignee: BioLogistics LLC, Garner, IA (US)

( * ) Notice: Subject to any disclaimer, the term of this patent is extended or adjusted under 35 U.S.C. 154(b) by 1301 days.

(21) Appl. No.: 13/422,485

(22) Filed: Mar. 16, 2012

(65) Prior Publication Data

US 2013/0059393 A1    Mar. 7, 2013

Related U.S. Application Data

(60) Provisional application No. 61/531,129, filed on Sep. 6, 2011.

(51) Int. Cl.
*B01J 20/286* (2006.01)
*B01J 20/32* (2006.01)

(52) U.S. Cl.
CPC .......... *B01J 20/286* (2013.01); *B01J 20/3219* (2013.01); *B01J 20/3274* (2013.01); *Y10T 436/255* (2015.01)

(58) Field of Classification Search
None
See application file for complete search history.

(56) References Cited

U.S. PATENT DOCUMENTS

| 4,446,275 | A | * | 5/1984 | Filka et al. | 525/54.1 |
| 4,923,980 | A | * | 5/1990 | Blomberg | C07H 15/12 |
| | | | | | 127/29 |
| 7,812,006 | B2 | * | 10/2010 | Mistretta et al. | 514/54 |

OTHER PUBLICATIONS

Bergami, M. et al. "Affinity chromatography of α,α-trehalase: Coupling of oligosaccharides to aminohexyl sepharose," European Journal of Applied Microbiology and Biotechnology, 1979, vol. 7, Issue 1, pp. 53-57.*
Willis, F. M. et al. "UV Detectors," Today's Chemist at Work, Jul. 2004.*
Dirk Vetter and Mark A. Gallop; Strategies for the Synthesis and Screening of Glycoconjugates. 1. A Library of Glycosylamines; American Chemical Society Abstract; Apr. 15, 1995; pp. 316-318; Advance ACS Abstracts, California USA.
Reinhold J. Baues and Gary R. Gray; Lectin Purification on Affinity Columns Containing Reductively Aminated Disaccharides; journal; Jan. 10, 1977; pp. 57-60; vol. 252, No. 1; The Journal of Biological Chemistry, USA.

* cited by examiner

*Primary Examiner* — Yelena G Gakh
*Assistant Examiner* — Michelle Adams
(74) *Attorney, Agent, or Firm* — Zarley Law Firm, P.L.C.

(57) ABSTRACT

Methods for making designed carbohydrate affinity columns and lectin columns are provided. Reducing sugar of choice is dissolved in pH 6.0 acetate buffer and injected onto a primary amino group functionality column. The column is washed with pH 6.0 acetate buffer and the column effluent monitored with a variable wavelength UV detector. Lectin columns are made by injecting appropriate lectin to the designed carbohydrate and the lectin binds to this scaffold. The lectin column is formed.

14 Claims, 5 Drawing Sheets

AFFINITY/LECTIN CHROMATOGRAPHY METHODS

CROSS REFERENCE TO RELATED APPLICATION

This application claims the benefit of U.S. Provisional Application No. 61/531,129 filed Sep. 6, 2011.

BACKGROUND OF THE INVENTION

Methods, systems and kits for making carbohydrate affinity columns and lectin columns are provided. The methods for making carbohydrate/lectin affinity columns are often tedious and limiting in the carbohydrates one can use found in *Journal of Biological Chemistry* 252 (1) 57-60 (1977) by R Baues and G Gray. Synthesis of carbohydrate affinity columns has been reviewed by P Cuatrecasas and C Anfinsen in *Ann. Rev. Biochem.* Vol 40 259-278 1971 and by Zhu, Bilgin and Snyder in *Ann. Rev. Biochem.* Vol. 72 783-812 2003 for proteomic applications of the chemistries involved. Either protecting groups or complex synthetic schemes are necessary to prepare carbohydrate lectin affinity columns. None of these methods allow for a simple method to prepare carbohydrate affinity columns as a general method with potentially any reducing sugar available. And, there are no simple methods for preparing lectin columns, therefore few exist commercially. Con A is commercially available and its use described in *J. Invest. Dermatol.* 85 165-168 (1985) by G Imokawa and Y Mishima. Certainly there is a need for simple methods for the preparation of a wide range of carbohydrate/lectin affinity columns. The present application addresses these needs.

BRIEF SUMMARY OF THE INVENTION

A method of making a carbohydrate affinity column. The method includes adding a reducing sugar to an acetate buffer, pH 6.0 to form a solution. The solution is then injected on to an amino group functionality column and the column is washed with a secondary acetate buffer.

DETAILED DESCRIPTION OF THE PREFERRED EMBODIMENT

Figure 1:
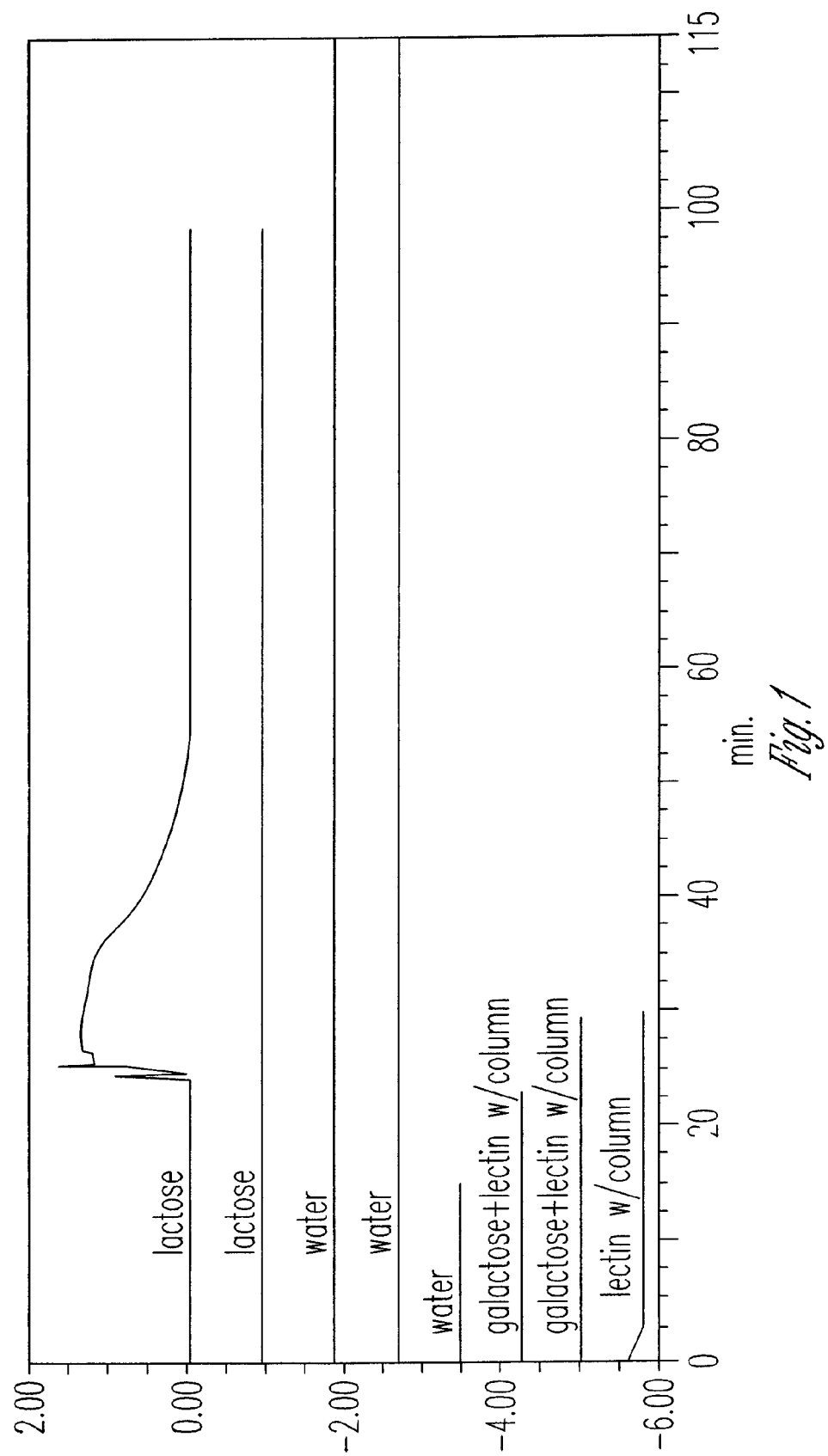
FIG. 1 is a graph that demonstrates the use of lactosyl primary amine affinity column. It shows the UV 280 nm for protein detection, traces of various treatments of this column with non-specific eluents and then with a β-D-galactoside containing eluent; the only compound that releases and elutes this lectin is lactose.
Figure 2:
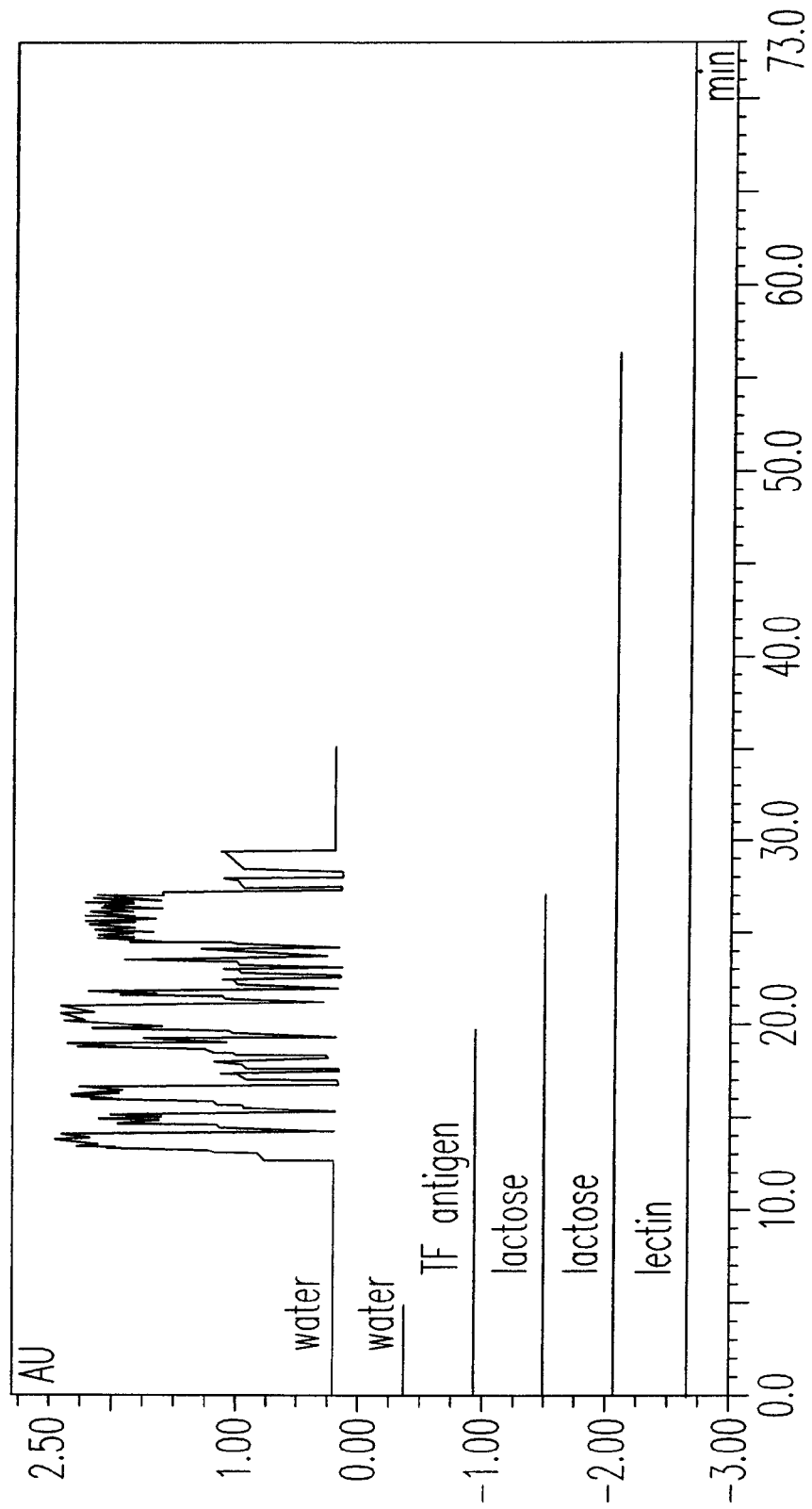
FIG. 2 is a graph that demonstrates a TF antigen primary amine affinity column. It also shows the UV 280 nm for protein detection, traces of various treatments of this column with non-specific and specific eluents and their ineffectiveness. The only eluent that removes the bound lectin is water.

The primary amino column was washed with pH 6.0 acetate buffer until 10 column volumes had been washed over it. Reducing sugar (1 mg/ml in pH 6.0 acetate buffer) was injected onto the column with an autosampler, 0.05 ml injected. An attempt to wash it off was done. Water alone was not used here. To demonstrate specific binding, lectin, is injected. The column was washed with pH 6.0 acetate buffer. Lectin, 0.5 mg/m.l, is injected onto the affinity column. The column was washed with pH 6.0 acetate buffer and no protein was removed. An attempt to specifically wash it off was done by eluting with reducing sugar. The eluents used can be water, acetate buffer, pH 6.00, and 1 mg/ml reducing sugar, in acetate sulfur small amounts of acetonitrile can be used in the eluent. See FIGS. 1 and 2 for illustration of these experiments. The effluent from the column was monitored by UV absorbance at 280 nm to detect protein.

EXAMPLES

The examples shown below more aptly describe the process involved in preparing an affinity column as well as a lectin column. These are examples that demonstrate concept and in no way limit the scope of applications that are possible with these methods.

Example 1

The primary amino column was washed with pH 6.0 acetate buffer until 10 column volumes had been washed over it. Lactose (1 mg/ml in pH 6.0 acetate buffer) was injected onto the column with an autosampler, 0.05 ml injected. An attempt to wash it off was done. To demonstrate lactose binding, lectin specific for β-D-galactosides was used. The column was washed with pH 6.0 acetate buffer. Viscum album lectin, 0.5 mg/ml, is injected onto the affinity column. The column was washed with pH 6.0 acetate buffer and no protein was removed. An attempt to specifically wash it off was done by eluting with lactose. This was accomplished. See FIG. 1 for illustration of these experiments. The effluent from the column was monitored by UV absorbance at 280 run for protein detection.

Example 2

The primary amino column was washed with pH 6.0 acetate buffer until 10 column volumes had been washed over it. Galactose-1,3-β-D-GalNAc, TF antigen (1 mg/ml in pH 6.0 acetate buffer), was injected onto the column with an autosampler, 0.05 ml injected. An attempt to wash it off was done. Water alone was not used here. To demonstrate specific binding, lectin, specific for β-D-galactosides, is injected. The column was washed with pH 6.0 acetate buffer. Viscum album lectin, 0.5 mg/ml, is injected onto the affinity column. The column was washed with pH 6.0 acetate buffer and no protein was removed. An attempt to specifically wash it off was done by eluting with lactose. This was not accomplished. The eluent that removes TF antigen and lectin is water alone. See FIG. 2 for illustration of these experiments. The effluent from the column was monitored by UV absorbance at 280 nm to detect protein.

Example 3

Figure 3:
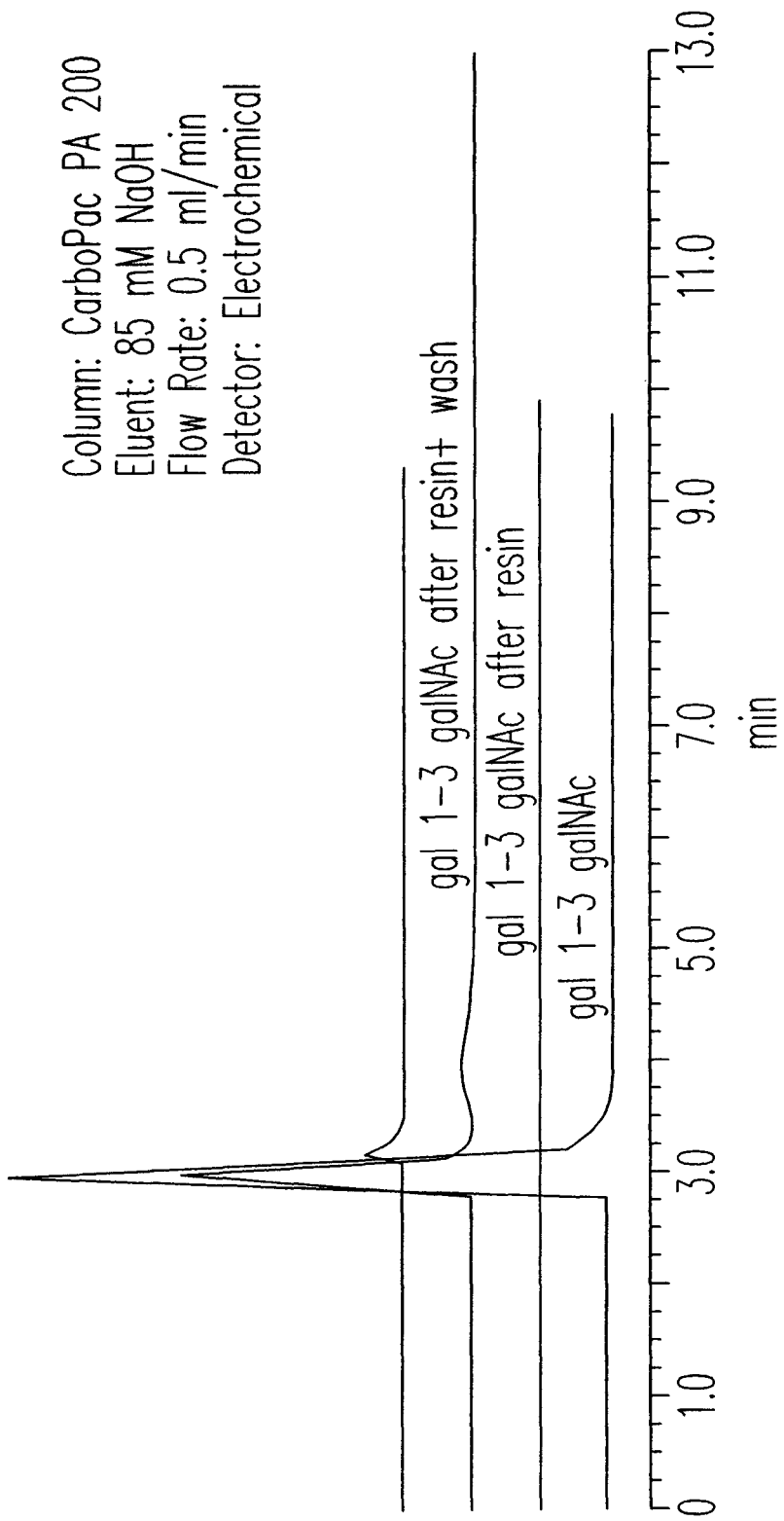
FIG. 3 is a graph that shows the chromatography of TF antigen before addition of resin after resin addition and then after adding water to the resin. It demonstrates the synthesis of the affinity support and removal of the 2-acetamido reducing sugar with water.
Figure 4:
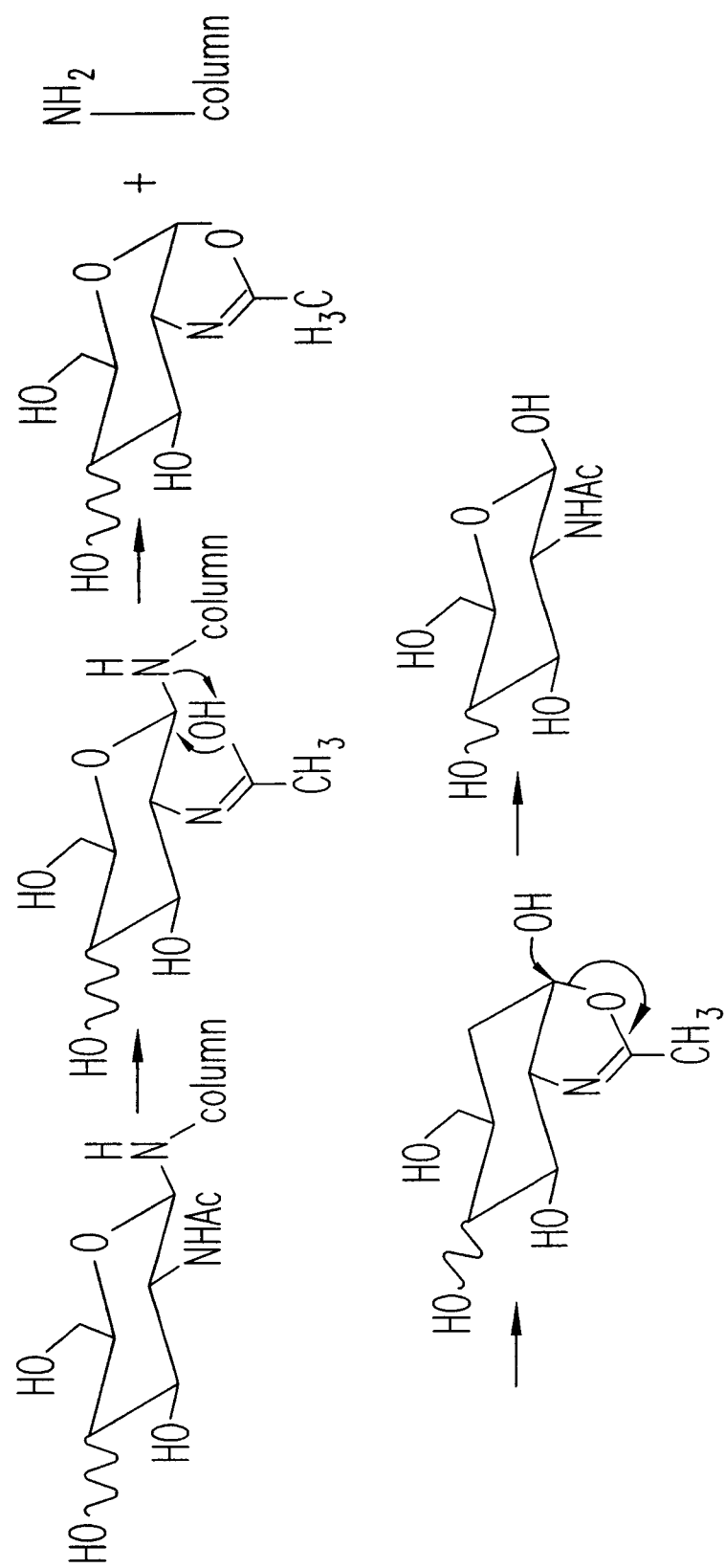
FIG. 4 is a scheme that depicts the proposed mechanism for the hydrolysis of N-acetyl hexosylamine from primary amine column.

The hydrolysis of Gal-1,3-β-GalNAc from the resin with water is demonstrated in FIG. 3 noted above. This is an HPAEC trace of this compound before treatment with primary amino column, after treatment with column and then after water addition to column. It should be noted that all detectable Gal-1,3-β-GalNAc was bound to the column and then removed with water as explained by FIG. 4, the anchimeric assisted hydrolysis of HexNAc sugars bound to an amino column.

Figure 5:
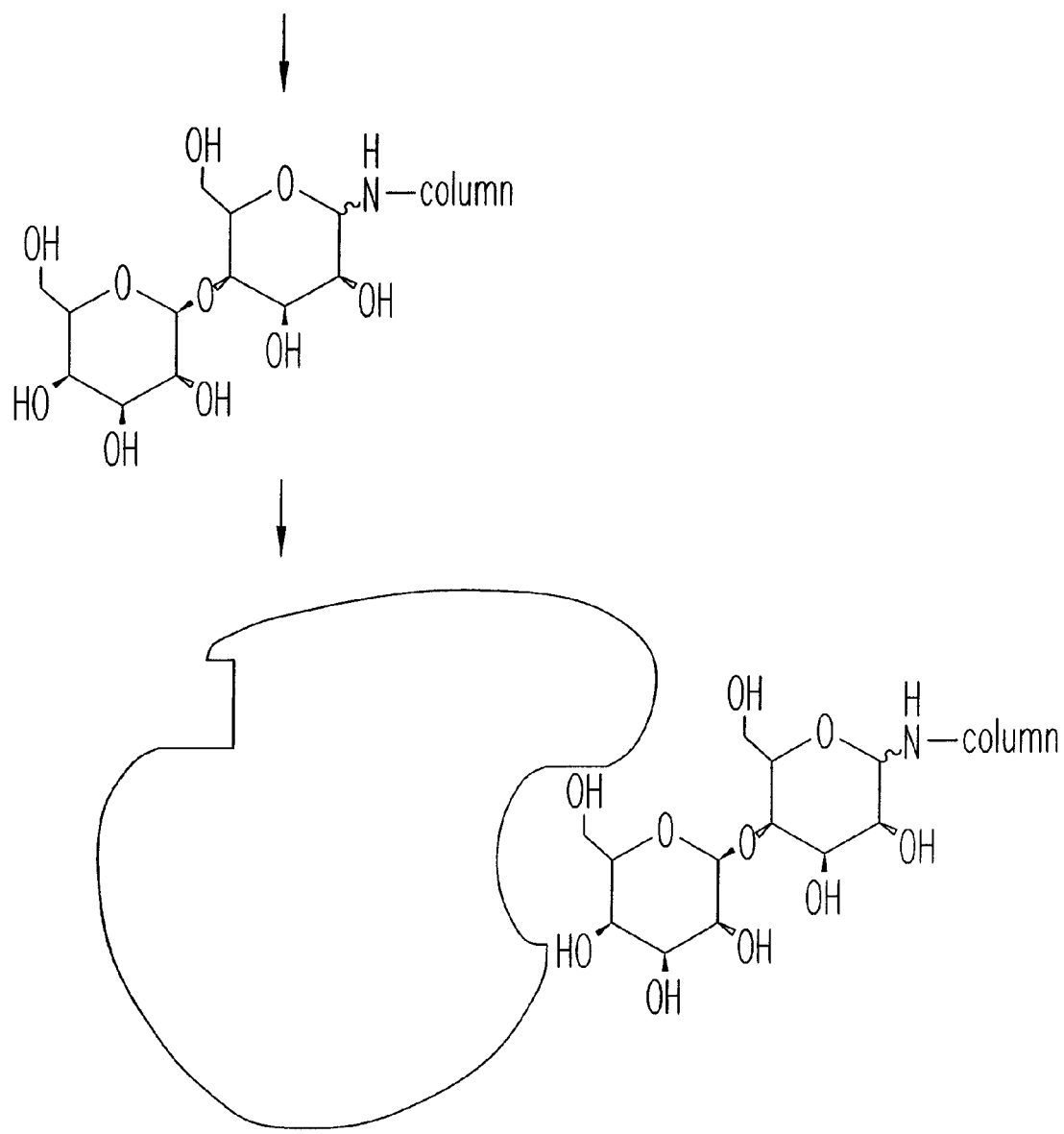
FIG. 5 illustrates a flow diagram of how the reducing sugar is attached to the primary amine column and subsequent attachment of the lectin.

Thus, Methods for making designed carbohydrate affinity columns and lectin columns are provided. Reducing sugar of choice is dissolved in pH 6.01 acetate buffer and injected onto a primary amino group functionality column. The column is washed with pH 6.01 acetate buffer and the column effluent monitored with a variable wavelength UV detector for protein. Lectin columns are made by injecting appropriate lectin to the designed carbohydrate and the lectin binds to this scaffold. The lectin column is formed, FIG. 5.

The reducing sugar dissolved in pH 6.0 acetate buffer can be selected from a group of all reducing sugars, with examples such as sulfo lewis A, GalNAc (Tn antigen), Galactose-1,3-β-D-GalNAc (TF antigen) and lactose and all oligosaccharides and monosaccharides represented by these classes of carbohydrates. The lectins or carbohydrate binding proteins can be specific for any carbohydrate reducing sugar as noted in claim 2. The chemistry may be performed on bound carbohydrate as noted in FIG. 5 and may include periodate treatment to generate aldehydes which may bind protein amino groups in pH 6.00 acetate buffer to produce bound protein.

What is claimed is:

1. A method of making a carbohydrate affinity column, the method comprising the steps of:
    adding a reducing sugar to an acetate buffer to form a solution;
    injecting the solution onto an amino group functionality column; and
    washing the column with a secondary acetate buffer.

2. The method of claim 1 further comprising the step of adding lectin and a tertiary acetate buffer to the washed column.

3. The method of claim 1 wherein the acetate buffer is a sodium acetate buffer with a pH level of 6.0.

4. The method of claim 1 wherein the secondary acetate buffer has a pH level of 6.0.

5. The method of claim 1 further comprising the step of monitoring an effluent from the column with a variable wavelength UV detector to detect protein.

6. The method of claim 1 wherein the reducing sugar is selected from a group consisting of sulfo lewis A, GalNAc, Gal-1,3-β-D-GalNAc, lactose, oligosaccharides and monosaccharides.

7. The method of claim 1 wherein the solution is injected using an autosampler.

8. The method of claim 1 wherein the solution is comprised of 1 mg/mL reducing sugar in acetate buffer.

9. The method of claim 1 further comprising the step of washing the column with an eluent.

10. The method of claim 9 wherein the eluent is selected from a group consisting of water, acetate buffer, and 1 mg/mL reducing sugar in acetate buffer.

11. The method of claim 1 further comprising the step of adding lectin to the column.

12. The method of claim 1 further comprising the step of performing a periodate treatment on the column.

13. The method of claim 1 further comprising the step of monitoring an effluent from the column with a UV detector at 280 nm to detect protein.

14. A method of making a carbohydrate affinity column, the method comprising the steps of:
    adding a reducing sugar to an acetate buffer to form a solution;
    injecting 0.05 mL of the solution onto an amino group functionality column multiple times; and
    washing the column with a secondary acetate buffer.

* * * * *